US 8,061,526 B2

(12) United States Patent
Henderson

(10) Patent No.: US 8,061,526 B2
(45) Date of Patent: Nov. 22, 2011

(54) WIG WAG BIN FLOW DIRECTORS

(76) Inventor: Deane R. Henderson, Salmon Arm (CA)

( * ) Notice: Subject to any disclaimer, the term of this patent is extended or adjusted under 35 U.S.C. 154(b) by 0 days.

(21) Appl. No.: 12/591,001

(22) Filed: Nov. 4, 2009

(65) Prior Publication Data

US 2010/0116721 A1    May 13, 2010

Related U.S. Application Data

(60) Provisional application No. 61/193,187, filed on Nov. 4, 2008.

(51) Int. Cl.
*B07C 5/14* (2006.01)

(52) U.S. Cl. ........ 209/518; 209/517; 209/519; 209/520; 209/521

(58) Field of Classification Search ................. 209/517, 209/518, 519, 520, 521
See application file for complete search history.

(56) References Cited

U.S. PATENT DOCUMENTS

| | | | | |
|---|---|---|---|---|
| 3,606,011 | A * | 9/1971 | Jeddeloh | 209/520 |
| 3,653,506 | A * | 4/1972 | Turner et al. | 209/518 |
| 3,696,948 | A * | 10/1972 | Murdoch et al. | 414/564 |
| 4,195,737 | A * | 4/1980 | Rysti | 209/521 |
| 4,318,807 | A * | 3/1982 | Maki-Hoimela et al. | 209/517 |
| 4,742,918 | A * | 5/1988 | Doherty | 209/517 |
| 4,742,920 | A * | 5/1988 | Doherty | 209/517 |
| 4,815,917 | A * | 3/1989 | Newnes | 414/268 |
| 6,629,592 | B2 * | 10/2003 | Bernard et al. | 198/360 |
| 2003/0230519 | A1 * | 12/2003 | Cesselli | 209/517 |

* cited by examiner

*Primary Examiner* — Terrell Matthews
(74) *Attorney, Agent, or Firm* — Anthony C. Edwards

(57) ABSTRACT

The flow director apparatus according to the present invention in such bins include a plurality of the flow directors which are pivotally mounted or mountable beneath said plurality of diverter gates and to said upper end of said frame so as to depend a free end of each flow director of said plurality of said flow directors downwardly from said upper end into an entrance cavity of said bin defined by said upper end of said frame. Each flow director is elongate and has a base end opposite said free end. Each flow director pivotally is mounted or mountable to said upper end of said frame at said base end of the flow director.

19 Claims, 3 Drawing Sheets

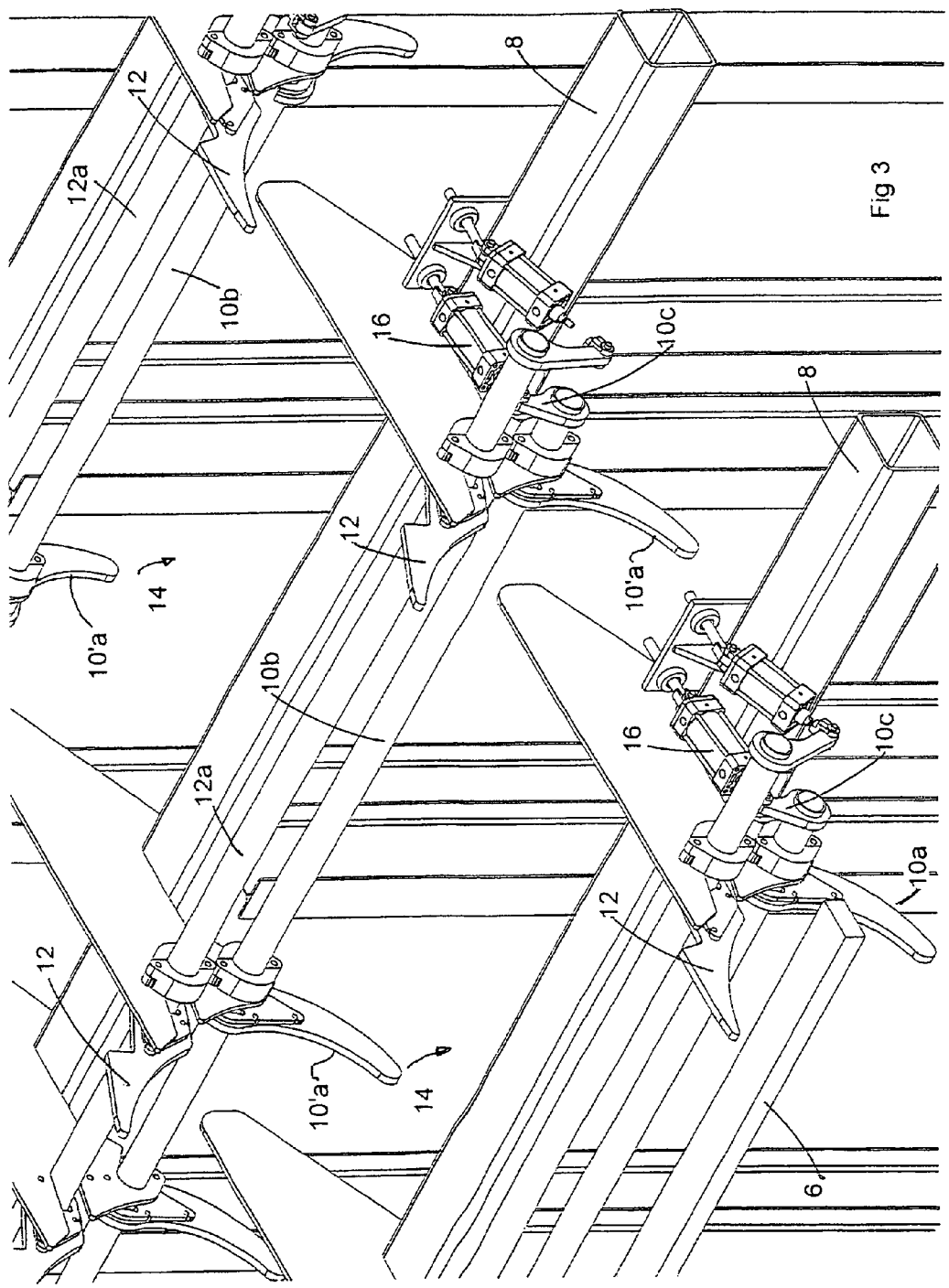

US 8,061,526 B2

WIG WAG BIN FLOW DIRECTORS

CROSS REFERENCE TO RELATED APPLICATION

This application claims priority from U.S. Provisional Patent Application No. 61/193,187 filed Nov. 4, 2008 entitled Wig Wag Bin Flow Directors and Canadian Patent Application No. 2,642,808 filed Nov. 4, 2008 entitled Wig Wag Bin Flow Directors.

FIELD OF THE INVENTION

This invention relates to the field of devices for directing lumber flow in a sawmill or planermill, and in particular to a device for use with bin sorters for sorting finished or rough boards into bins.

BACKGROUND OF THE INVENTION

Bin dividers are used to allow the flow of boards into a sorter bin to be directed to one side or the other side of the bin. This allows the bin to be filled more efficiently. Current bin dividers as illustrated in FIG. 1 use a full-length tube or pipe that free spans the width of the sorter with sheet metal plates welded to it to form a "vee" shape. The bin divider has bearings at either end supported by two structural members for each one. An air cylinder is typically used to flip the bin dividers from one side to the other. One problem with such a conventional system is that the bin divider is very heavy and requires a large cylinder to move it back and forth. Another problem is that because the bin divider is so long it is quite flexible and causes vibration when being rotated and stopped. Another problem is that the bin divider will pinch a board when it moves back and forth. This means that it must be rotated when there are no boards entering the bin and must be rotated quickly. Another problem is that the bin dividers can impede the operator from straightening out any crossed-up boards.

SUMMARY OF THE INVENTION

The present invention are wig wag bin flow directors and sorter bins incorporating same. The present invention may thus be characterized in one aspect as bin flow directors for use in a sorter bin having a bin sorter frame having an open upper end and an opposite bottom end wherein the frame is sized for receiving elongate members such as boards being sorted and translating along a flow path across and over the upper end of the frame. A plurality of diverter gates are pivotally mounted to the upper end of the frame and actuable between open and closed positions thereby directing the elongate members downwardly into the upper end of the frame when in the open position or allowing the elongate members to flow continuously along the flow path across and over the upper end of the frame when in the closed position.

The flow director apparatus according to the present invention in such bins include a plurality of the flow directors which are pivotally mounted or mountable beneath the plurality of diverter gates and to the upper end of the frame so as to depend a free end of each flow director of the plurality of the flow directors downwardly from the upper end into an entrance cavity of the bin defined by the upper end of the frame. Each flow director is elongate and has a base end opposite the free end. Each flow director pivotally is mounted or mountable to the upper end of the frame at the base end of the flow director.

At least one actuator is mounted to the upper end of the frame in cooperation with the plurality of flow directors so as to bias the plurality of flow directors between a first position wherein each flow director has its corresponding free end pointing to a first side of and across a bin cavity defined by the frame beneath the entrance cavity, and a second position wherein each flow director is pointing substantially directly downwardly into the bin cavity to a second side of the bin cavity opposite the first side. The base ends of the flow directors are mounted to the upper end of the bin on a downstream side of the opening into the upper end of the bin frame downstream relative to the flow path of the elongate members where the flow path crosses over the opening into the bin.

In a further aspect of the present invention, the invention includes not only the flow director apparatus itself, but also the sorter bins, such as described above, which incorporate the flow director apparatus.

The flow director apparatus may further include a shaft which is rotatably mounted to the upper end of the bin frame at the downstream side of the opening, wherein the plurality of flow directors are mounted to the shaft. The actuator or actuators may in that case operate on, so as to selectively rotate, the shaft.

In a preferred embodiment each flow director includes a curved elongate arm having a concave curvature facing upstream into the direction of flow of the elongate members translating along the flow path. The plurality of diverter gates define, when in their open position, a downwardly deflecting in-flow trajectory for diverted elongate members being diverted from the elongate members in the flow path. The concave curvature of plurality of flow directors when the flow directors are in their first position define a curved trajectory for the diverted elongate members. The curved first trajectory projects a first diversion flow path downwardly from the plurality of flow directors to the first side of the bin cavity. In the second position the flow directors define a second trajectory for the diverted elongate members. The second trajectory projects a second diversion flow path downwardly from the plurality of flow directors to the second side of the bin cavity.

Advantageously the inflow trajectory and the curved first trajectory may be substantially tangentially aligned so as to provide a substantially smoothly curved first diversion flow path along both the plurality of diverter gates and the plurality of flow directors. The inflow trajectory and the second trajectory may be substantially tangentially aligned so that the second diversion flow path is substantially a smoothly curved path along both the plurality of diverter gates and the plurality of flow diverters.

In operation, the diverter gates are opened to direct elongate members along the inflow trajectory. With the flow directors in the first position the elongate members are smoothly transferred down along the concave surfaces of the arms on the curved first trajectory so as to urge the elongate members to the first side of the bin. With the flow directors in the second position the elongate members are transferred down along the second trajectory to urge the elongate members to fall to the second side of the bin. As the bin fills the flow directors may be alternatingly wagged between the first and second positions to smoothly fill the bin.

BRIEF DESCRIPTION OF THE DRAWINGS

FIG. 3 is a perspective view of a system of diverter gates and wig wag bin flow directors according to the present invention.

DETAILED DESCRIPTION OF EMBODIMENTS OF THE INVENTION

Figure 1:
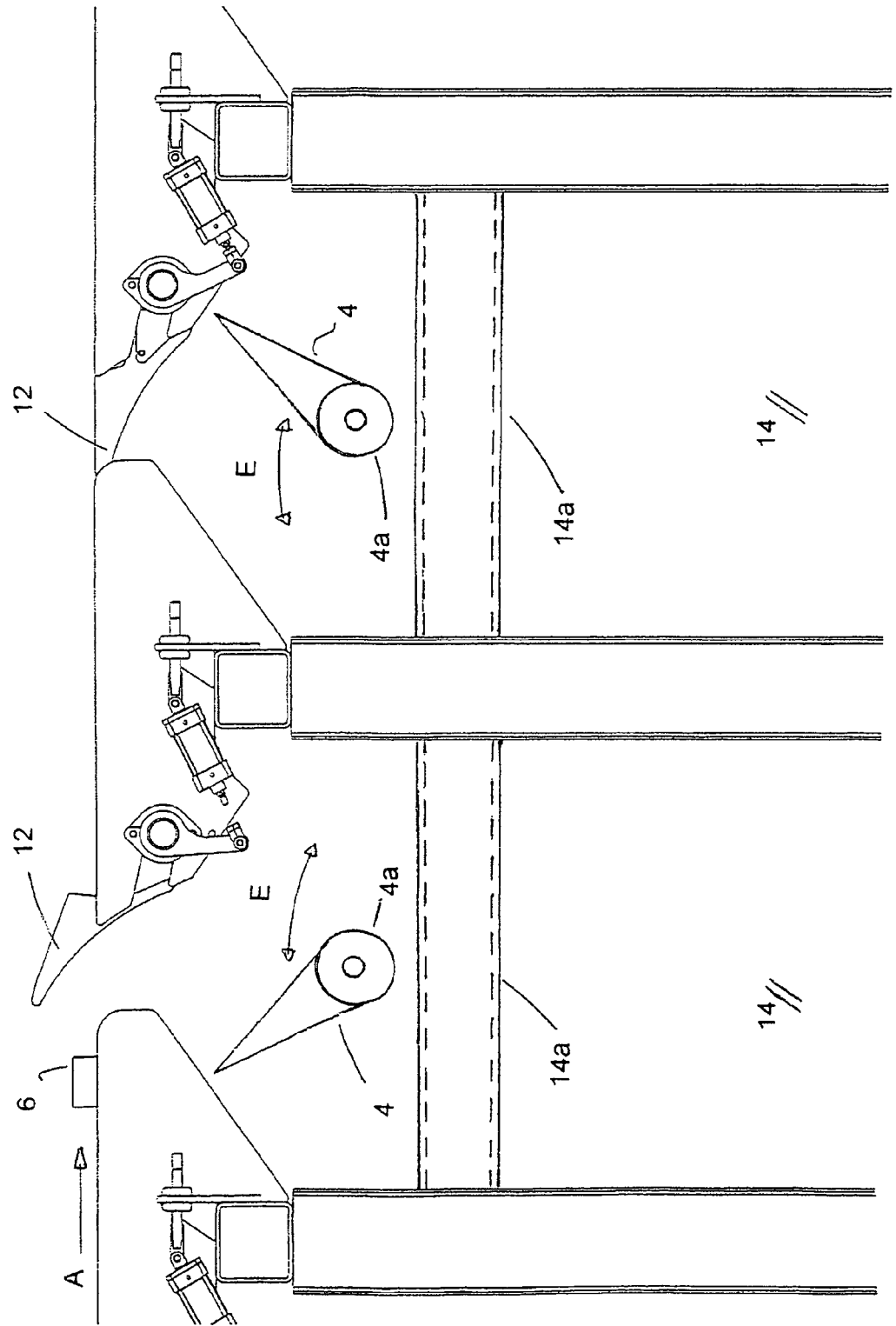
FIG. 1 is a side elevation view of a prior art diverter gate and divider arrangement.

The wig wag bin flow directors 10 according to the present invention are in one preferred embodiment a spaced apart parallel array of curved arms 10a rigidly mounted on a shaft 10b. The shaft may be mounted to existing steel members 8 and does not have to free span the width of the sorter. Shaft 10b may parallel along below the shaft 12a on which diverter gates 12 are mounted. The present invention is therefore much lighter than typical bin dividers. Bin diverter gates 12 and wig wag bin flow directors 10 divert elongate members such as boards 6 moving in direction A into the cavity of a desired bin 14. Typically one such wig wag bin flow director 10 is provided for each diverter gate 12. A 20-foot sorter system would typically have four diverter gates 12 per bin 14 and therefore four wig wag bin flow directors 10. A smaller system such as a stud line could have as little as two diverter gates and two wig wag bin flow directors per bin. The air cylinder 16 to move the wigwag bin flow directors may be much smaller than the air cylinder required for typical bin dividers.

The wig wag bin flow directors 10 may be actuated at anytime. They may be rotated slowly. Their design reduces the possibility of pinching a board 6. The wig wag bin flow directors 10 do not impede the operator's ability to deal with crossed boards, as the boards typically cross-up below the flow directors.

Whereas conventional bin dividers 4 as shown in the depiction of prior art in FIG. 1 are supported on long free span tubes or pipes 4a from the bin structure which includes beams 14a and are vertically oriented upwards for their flipping in direction E, the flow directors 10 according to the present invention are hung downwardly from the sorter. They operate oppositely to the conventional bin dividers. The conventional bin flow dividers 4 operate in direction E in a "V"-shaped range-of-motion rotating about tubes 4a. The flow directors 10 operate in an inverted "V"-shaped range-of-motion path rotating in direction C.

Figure 2:
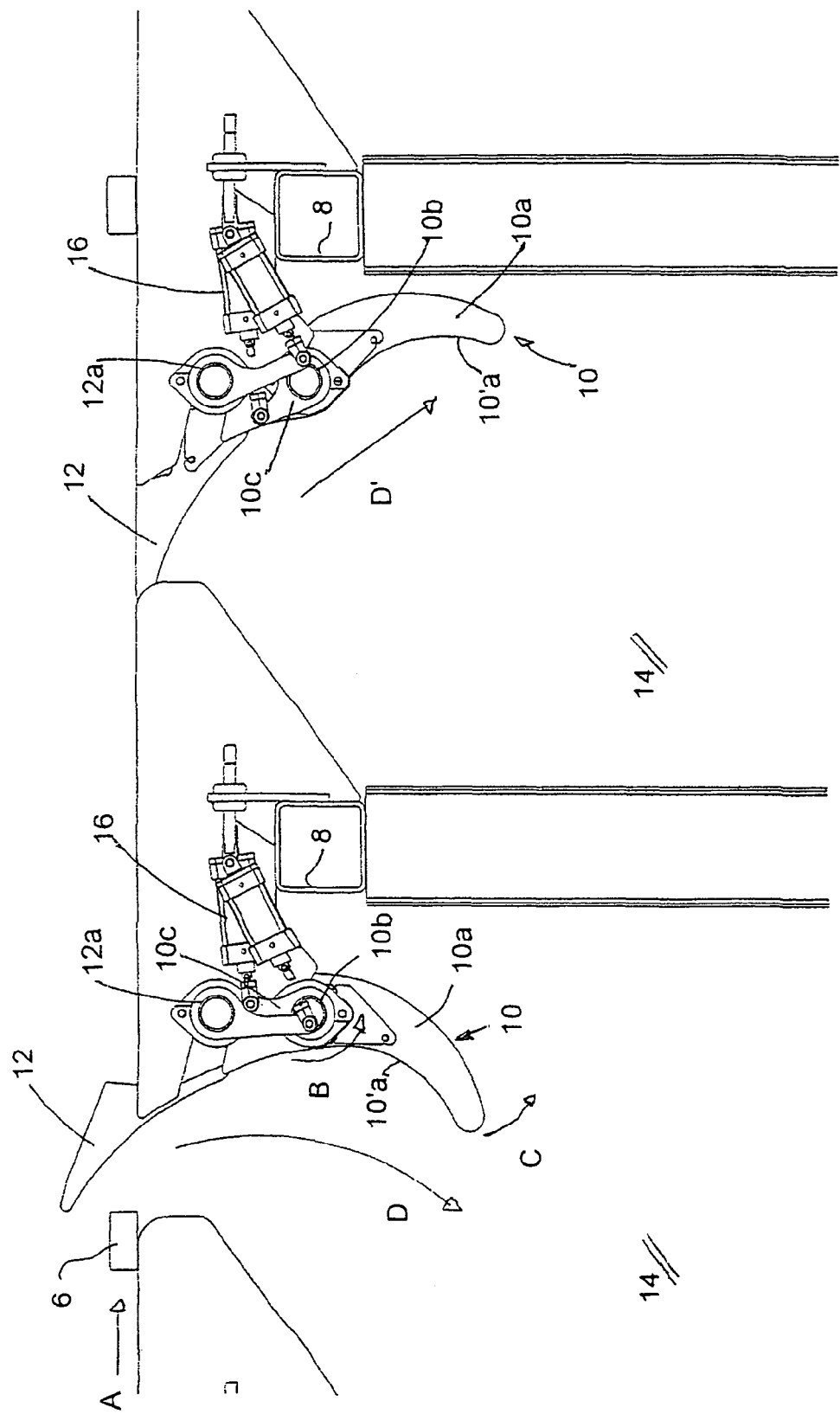
FIG. 2 is a side elevation view of a pair of diverter gates and wig wag bin flow directors according to the present invention.

In particular, rotation of shafts 10b in direction B by actuation of cylinders 16 operating on crank arms 10c swing arms 10a in corresponding direction C between first and second positions. In their first position as seen at the left in FIG. 2, assuming the associated diverter gates 12 are elevated to their open position to capture boards 6 approaching in direction A, the flow directors flow boards along an inflow trajectory under and along the diverter gates and then along a curved first trajectory in direction D to the left in bin 14. In their second position as seen at the right in FIG. 2 the flow directors flow boards along the inflow trajectory under the diverter gates and then along a second trajectory in direction D' downwardly and to the right in bin 14. Because the first and second trajectories project to the corresponding first and second sides (shown for illustration purposes as left and right sides in FIG. 2), the diverted boards are also projected or urged to the corresponding sides of the bin cavity. The position of the flow directors may be alternated back and forth between their corresponding first and second positions to smoothly and evenly fill the bin.

Arms 10a are preferably concavely curved so as to cup the boards into the smoothly curved first trajectory to the left in the first position of the flow directors and into a smoothly downwardly directed trajectory when in the second position. The arms may thus have concave surfaces 10a' facing the direction of flow of the boards.

As will be apparent to those skilled in the art in the light of the foregoing disclosure, many alterations and modifications are possible in the practice of this invention without departing from the spirit or scope thereof.

What is claimed is:

1. A sorter bin comprising:
   a bin sorter frame having an open upper end and an opposite bottom end and spaced apart opposed facing sidewalls members, wherein said frame is sized so as to space apart said sidewall members sufficiently for receiving elongate members being sorted and translating along a flow path across and over said upper end of said frame,
   a plurality of diverter gates pivotally mounted to said upper end of said frame and actuable between open and closed positions thereby directing the elongate members downwardly into said upper end of said frame when in said open position or allowing the elongate members to flow continuously along the flow path across and over said upper end of said frame when in said closed position,
   a plurality of flow directors pivotally mounted beneath and adjacent said plurality of diverter gates and to said upper end of said frame so as to depend between said opposed facing sidewall members a free end of each flow director of said plurality of said flow directors downwardly from said upper end into an entrance cavity of said bin defined by said upper end of said frame, said each flow director being elongate and having a base end opposite said free end, said each flow director pivotally mounted to said upper end of said frame at said base end,
   at least one actuator mounted to said upper end of said frame and cooperating with said plurality of flow directors so as to bias said plurality of flow directors between a first position wherein said each flow director has its corresponding said free end pointing to a first side of and across a bin cavity defined by said frame beneath said entrance cavity, and a second position wherein said each flow director is pointing substantially directly downwardly into said bin cavity to a second side of said bin cavity opposite said first side,
   and wherein said base ends of said plurality of flow directors are mounted to said upper end on a downstream side of an opening into said upper end downstream relative to the flow path of the elongate members where the flow path crosses over said opening,
   and wherein said plurality of flow directors are unencumbered when said elongate members are in a lower end of said frame so that said plurality of flow directors are free to wag between said first and second positions during each filling of the frame with the elongate members as the elongate members are diverted, and wherein said actuator wags said plurality of flow directors to each of, so as to oscillate between, said first and second positions during each filling of said frame with the elongate members.

2. The sorter bin of claim 1 further comprising a pair of shafts rotatably mounted to said upper end of said frame at said downstream side of said opening, wherein said plurality of diverter gates are mounted to a first shaft of said pair of shafts and wherein said plurality of flow directors are mounted to a second shaft of said pair of shafts, and wherein said base end is at substantially the same elevation as a corresponding pivot end of a corresponding diverter gate of said plurality of diverter gates.

3. The sorter bin of claim 2 wherein said at least one actuator operates on, so as to selectively rotate, said second shaft.

4. The sorter bin of claim 3 further comprising at least one second actuator mounted to said upper end of said frame and operating on, so as to selectively rotate, said first shaft, wherein said at least one actuator and said at least one second actuator are mounted adjacent one another in pairs of said actuator and said second actuator.

5. The sorter bin of claim 1 wherein said each flow director is a curved elongate arm having a concave curvature facing upstream into a flow direction of the elongate members translating along said flow path.

6. The sorter bin of claim 5 wherein said plurality of diverter gates define, when in their open position, a downwardly deflecting in-flow trajectory for diverted elongate members being diverted from the elongate members in the flow path, and wherein said concave curvature of said plurality of flow directors when in said first position define a curved first trajectory for the diverted elongate members, said curved first trajectory projecting a first diversion flow path downwardly from said plurality of flow directors to said first side of said bin cavity, and when in said second position define a second trajectory for the diverted elongate members, said second trajectory projecting a second diversion flow path downwardly from said plurality of flow directors to said second side of said bin cavity, wherein said plurality of flow directors engage the diverted elongate members and redirect the diverted elongate members along respectively said curved first and second trajectories and said first and second diversion flow paths when said plurality of flow directors are in said first and second positions respectively.

7. The sorter bin of claim 6 wherein said inflow trajectory and said curved first trajectory are substantially tangentially aligned so as to provide a substantially smoothly curved said first diversion flow path along both said plurality of diverter gates and said plurality of flow directors.

8. The sorter bin of claim 7 wherein said inflow trajectory and said second trajectory are substantially tangentially aligned so that said second diversion flow path is substantially a smoothly curved path along both said plurality of diverter gates and said plurality of flow diverters.

9. The sorter bin of claim 8 wherein said each flow director is substantially the same length as said each diverter gate.

10. A method for sorting boards comprising the steps of:
    a) providing a bin sorter frame having an open upper end and an opposite bottom end and spaced apart opposed facing sidewalls members, wherein said frame is sized so as to space apart said sidewall members sufficiently for receiving elongate members being sorted and translating along a flow path across and over said upper end of said frame,
    b) providing a plurality of diverter gates pivotally mounted to said upper end of said frame and actuable between open and closed positions, thereby directing the elongate members downwardly into said upper end of said frame when in said open position or allowing the elongate members to flow continuously along the flow path across and over said upper end of said frame when in said closed position,
    c) providing a plurality of flow directors pivotally mounted beneath and adjacent said plurality of diverter gates and to said upper end of said frame so as to depend between said opposed facing sidewall members a free end of each flow director of said plurality of said flow directors downwardly from said upper end into an entrance cavity of said bin defined by said upper end of said frame, said each flow director being elongate and having a base end opposite said free end, said each flow director pivotally mounted to said upper end of said frame at said base end,
    d) providing at least one actuator mounted to said upper end of said frame and cooperating with said plurality of flow directors so as to bias said plurality of flow directors between a first position wherein said each flow director has its corresponding said free end pointing to a first side of and across a bin cavity defined by said frame beneath said entrance cavity, and a second position wherein said each flow director is pointing substantially directly downwardly into said bin cavity to a second side of said bin cavity opposite said first side,
        and wherein said base ends of said plurality of flow directors are mounted to said upper end on a downstream side of an opening into said upper end downstream relative to the flow path of the elongate members where the flow path crosses over said opening,
    e) actuating said plurality of diverter gates to said open position,
    f) actuating said plurality of flow directors to said first position to fill said first side of said bin cavity,
    g) actuating said plurality of flow directors to said second position to fill said second side of said bin cavity, and wherein said plurality of flow directors are unencumbered when said elongate members are in a lower end of said frame so that said plurality of flow directors are free to wag between said first and second positions during each filling of the frame with the elongate members as the elongate members are diverted, and wherein said actuator wags said plurality of flow directors to each of, so as to oscillate between, said first and second positions during each filling of said frame with the elongate members.

11. The method of claim 10 wherein said actuating steps f) and g) are performed alternatingly as said bin cavity is filled.

12. For use in a sorter bin having a bin sorter frame having an open upper end and an opposite bottom end wherein said frame is sized for receiving elongate members being sorted and translating along a flow path across and over said upper end of said frame, wherein a plurality of diverter gates are pivotally mounted to said upper end of said frame and actuable between open and closed positions thereby directing the elongate members downwardly into said upper end of said frame when in said open position or allowing the elongate members to flow continuously along the flow path across and over said upper end of said frame when in said closed position, a flow director apparatus comprising:

a plurality of flow directors pivotally mounted beneath and adjacent said plurality of diverter gates and to said upper end of said frame so as to depend a free end of each flow director of said plurality of said flow directors downwardly from said upper end into an entrance cavity of said bin defined by said upper end of said frame, said each flow director being elongate and having a base end opposite said free end, said each flow director pivotally mounted to said upper end of said frame at said base end, at least one actuator mounted to said upper end of said frame and cooperating with said plurality of flow directors so as to bias said plurality of flow directors between a first position wherein said each flow director has its corresponding said free end pointing to a first side of and across a bin cavity defined by said frame beneath said entrance cavity, and a second position wherein said each flow director is pointing substantially directly downwardly into said bin cavity to a second side of said bin cavity opposite said first side, and wherein said base ends of said plurality of flow directors are mounted to said upper end on a downstream side of an opening into said upper end downstream relative to the flow path of the elongate members where the flow path crosses over said opening, and wherein said plurality of flow directors are unencumbered when said elongate members are in a lower end of said frame so that said plurality of flow directors are free to wag between said first and second positions during each filling of the frame with the elongate members as the elongate members are diverted, and wherein said actuator wags said plurality of flow directors to each of, so as to oscillate between, said first and second positions during each filling of said frame with the elongate members.

13. The apparatus of claim 12 further comprising a shaft rotatably mounted to said upper end of said frame at said downstream side of said opening, wherein said plurality of flow directors are mounted to said shaft.

14. The apparatus of claim 13 wherein said at least one actuator operates on, so as to selectively rotate, said shaft.

15. The apparatus of claim 12 wherein said each flow director includes a curved elongate arm having a concave curvature facing upstream into a flow direction of the elongate members translating along said flow path.

16. The apparatus of claim 15 wherein said plurality of diverter gates define, when in their open position, a downwardly deflecting in-flow trajectory for diverted elongate members being diverted from the elongate members in the flow path, and wherein said concave curvature of plurality of flow directors when in said first position define a curved first trajectory for the diverted elongate members, said curved first trajectory projecting a first diversion flow path downwardly from said plurality of flow directors to said first side of said bin cavity, and when in said second position define a second trajectory for the diverted elongate members, said second trajectory projecting a second diversion flow path downwardly from said plurality of flow directors to said second side of said bin cavity, wherein said plurality of flow directors engage the diverted elongate members and redirect the diverted elongate members along respectively said curved first and second trajectories and said first and second diversion flow paths when said plurality of flow directors are in said first and second positions respectively.

17. The apparatus of claim 16 wherein said inflow trajectory and said curved first trajectory are substantially tangentially aligned so as to provide a substantially smoothly curved said first diversion flow path along both said plurality of diverter gates and said plurality of flow directors.

18. The apparatus of claim 17 wherein said inflow trajectory and said second trajectory are substantially tangentially aligned so that said second diversion flow path is substantially a smoothly curved path along both said plurality of diverter gates and said plurality of flow diverters.

19. The sorter bin of claim 18 wherein said each flow director is substantially the same length as said each diverter gate.

* * * * *